US010598795B2

(12) United States Patent
Elliott et al.

(10) Patent No.: US 10,598,795 B2
(45) Date of Patent: Mar. 24, 2020

(54) METHODS AND SYSTEMS FOR DETECTING POTENTIAL INTERFERENCE WITH A TRACKING DEVICE ASSOCIATED WITH A VEHICLE

(71) Applicant: Verizon Patent and Licensing Inc., Arlington, VA (US)

(72) Inventors: Bryant Elliott, Atlanta, GA (US); Eric Berkobin, Atlanta, GA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 933 days.

(21) Appl. No.: 14/815,681

(22) Filed: Jul. 31, 2015

(65) Prior Publication Data
US 2017/0031026 A1  Feb. 2, 2017

(51) Int. Cl.
*G01S 19/21* (2010.01)

(52) U.S. Cl.
CPC ............ *G01S 19/21* (2013.01); *G01S 19/215* (2013.01)

(58) Field of Classification Search
CPC ................................ G01S 19/21; G01S 19/215
See application file for complete search history.

(56) References Cited

U.S. PATENT DOCUMENTS

| 5,952,969 | A  | * | 9/1999  | Hagerman | H04W 64/00 |
|-----------|----|---|---------|----------|------------|
|           |    |   |         |          | 342/457 |
| 8,395,513 | B2 | * | 3/2013  | Moran    | G08B 13/1427 |
|           |    |   |         |          | 340/539.13 |
| 8,718,673 | B2 | * | 5/2014  | Harper   | G01S 19/03 |
|           |    |   |         |          | 455/456.1 |
| 8,723,669 | B2 | * | 5/2014  | Freathy  | G08B 21/22 |
|           |    |   |         |          | 340/539.13 |
| 9,041,535 | B2 | * | 5/2015  | Hamerly  | H04W 4/025 |
|           |    |   |         |          | 340/539.13 |
| 2014/0095214 | A1 | * | 4/2014 | Mathe    | G06Q 40/08 |
|           |    |   |         |          | 705/4 |
| 2016/0370469 | A1 | * | 12/2016 | Mabuchi | G01S 19/215 |

* cited by examiner

*Primary Examiner* — Cassi J Galt

(57) ABSTRACT

An exemplary method includes a monitoring system identifying a time period during which a vehicle equipped with a tracking device travels at least a threshold distance, determining that the tracking device fails to acquire a desired signal for a predetermined amount of time during the time period, and determining, based on the determining that the tracking device fails to acquire the desired signal for the predetermined amount of time during the time period, that the tracking device is potentially being interfered with during the time period. Corresponding systems and methods are also described.

20 Claims, 9 Drawing Sheets

METHODS AND SYSTEMS FOR DETECTING POTENTIAL INTERFERENCE WITH A TRACKING DEVICE ASSOCIATED WITH A VEHICLE

BACKGROUND INFORMATION

Vehicle owners, fleet operators, insurers, and others often wish to track the location of vehicles during vehicle operations. Such data may be useful, for example, in fleet operations planning and management. This data may also be useful to track employee locations during work hours, allowing for improved employee oversight and management. Tracking of vehicle location may also allow, for example, automobile insurers to monitor the driving habits of those they insure, enabling insurers to offer financial incentives (e.g., reduced insurance rates) for customers who develop and maintain safe driving habits.

Devices for tracking vehicle locations over time may use a variety of means to collect vehicle location information, including but not limited to Global Positioning System ("GPS") devices and cellular-network-based location methods (e.g., cell tower triangulation). These tracking devices may upload collected information for analysis to a cloud-based server, for example, using one or more wired or wireless networks.

Unfortunately, tracking devices are often susceptible to tampering or disabling. For example, a person may surround a tracking device with a metallic shield. This may prevent a GPS-based tracking device from acquiring a GPS signal, thereby preventing collection of GPS-based location data. As another example, a user may utilize a jamming device to obscure, overload, or otherwise interfere with a tracking device, thereby preventing collection of location data. Similar devices are also available that may block wireless network transmissions, thereby preventing the tracking device from uploading location data through a wireless network to a server for analysis.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Methods and systems for detecting potential interference with a tracking device associated with a vehicle are disclosed herein. For example, as will be described in more detail below, a monitoring system may identify a time period during which a vehicle equipped with a tracking device travels at least a threshold distance, determine that the tracking device fails to acquire a desired signal (e.g., an externally provided GPS signal and/or a wireless network signal) for a predetermined amount of time during the time period, and, based on the determination that the tracking device fails to acquire the desired signal for the predetermined amount of time during the time period, determine that the tracking device is potentially being interfered with during the time period.

Various benefits may be realized in accordance with the methods and systems described herein. For example, by detecting that a tracking device in a vehicle is potentially being interfered with (e.g., by a jamming device, a signal blocking shield, etc.), the methods and systems described herein may improve the reliability and usefulness of the tracking device and the data that it generates. To illustrate, by detecting that a tracking device in a vehicle is potentially being interfered with, the methods and systems described herein may allow a user of the tracking device to maintain and/or improve employee discipline, prevent or deter theft of the vehicle, and/or improve the quality and/or reliability of services (e.g., service appointment scheduling) offered in connection with the vehicle. These and/or additional or alternative benefits that may be provided by the exemplary methods and systems described herein will be made apparent by the following description.

Figure 1:
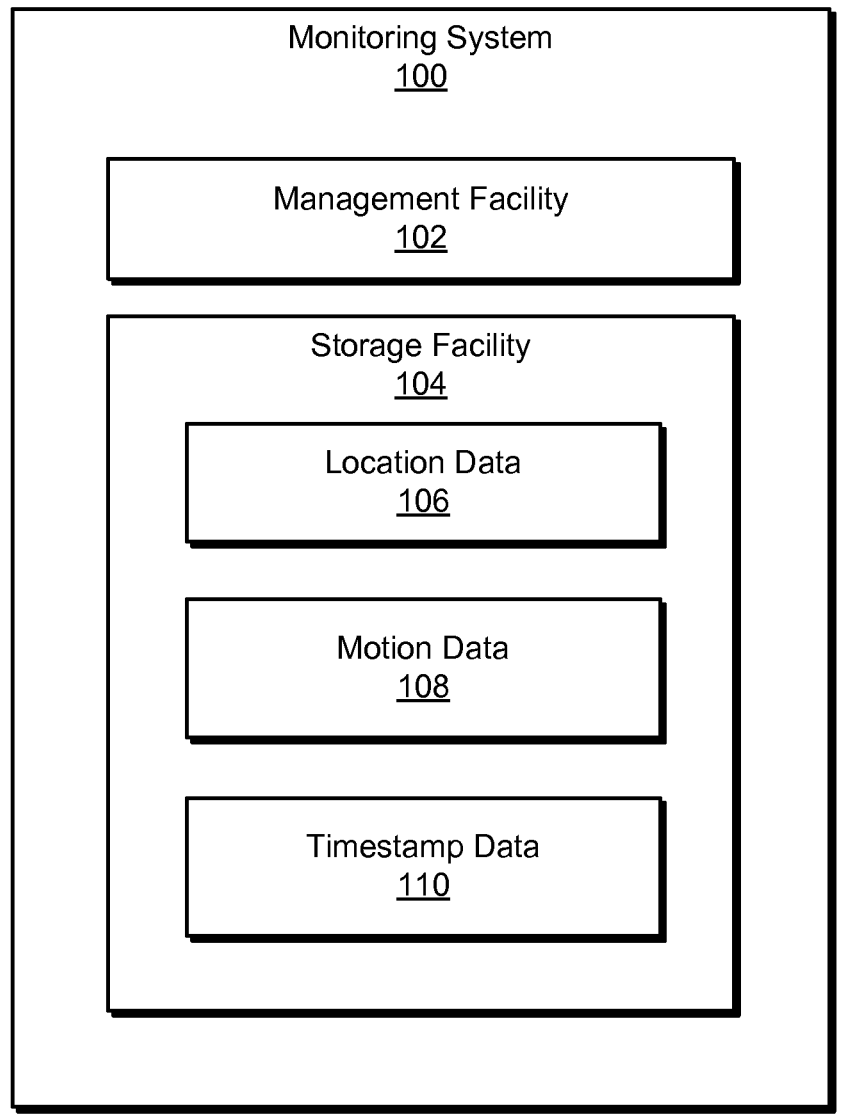
FIG. 1 illustrates an exemplary monitoring system according to principles described herein.

FIG. 1 illustrates an exemplary monitoring system ("system 100") that may detect potential interference with a tracking device associated with (e.g., included with or integrated into) a vehicle. While the methods and systems described herein are described with respect to tracking devices associated with vehicles, it will be recognized that the methods and systems described herein may additionally or alternatively be used to monitor tracking devices associated with other objects or persons.

As shown, system 100 may include, without limitation, a management facility 102 and a storage facility 104 selectively and communicatively coupled to one another. It will be recognized that although facilities 102 and 104 are shown to be separate facilities in FIG. 1, any of facilities 102 and 104 may be combined into fewer facilities, such as into a single facility, or divided into more facilities as may serve a particular implementation. Additionally or alternatively, one or more of the facilities 102 and 104 may be omitted from and external to system 100 in other implementations. For example, storage facility 104 may be external of and communicatively coupled to system 100 in certain alternative implementations. Facilities 102 and 104 of system 100 may include or be otherwise implemented by one or more physical computing devices specifically configured to perform one or more of the operations described herein. In such implementations, system 100 may be referred to as a computer-implemented system 100.

Storage facility 104 may maintain location data 106, which may include data representative of geographic locations. Location data 106 may be based on data acquired by the tracking device (e.g., GPS data), data acquired by one or more devices other than the tracking device (e.g., triangulation data), and/or any other data as may serve a particular implementation.

Storage facility 104 may additionally maintain motion data 108, which may include data representative of the motion of a tracked vehicle (e.g., how far the vehicle travels during a particular trip, a direction that the vehicle travels, acceleration of the vehicle, etc.). Motion data 108 may be based on data acquired by the tracking device (e.g., GPS data), data acquired by one or more devices other than the tracking device (e.g., triangulation data, on-board diagnostic ("OBD") data, mileage data, mobile device sensor data, etc.) and/or any other data as may serve a particular implementation.

Storage facility 104 may additionally maintain timestamp data 110. Timestamp data 110 may correspond to location data 106 (e.g., timestamp data 110 may indicate specific points in time at which the various geographic locations represented by location data 106 are detected). Additionally or alternatively, timestamp data 110 may correspond to motion data 108 (e.g., timestamp data 110 may indicate specific points in time at which various motion data values are detected). To illustrate, timestamp data 110 may include data representative of a time at which there is a detected change in acceleration by the vehicle, a time at which the vehicle begins moving, a time at which the vehicle stops moving, etc. In some examples, timestamp data 110 may be derived from location data 106 and/or motion data 108.

Storage facility 104 may maintain additional or alternative data as may serve a particular implementation. Data maintained by storage facility 104 may be accessed by system 100 from any suitable source, including a source internal or external to system 100. Thus, while storage facility 104 is shown to be within system 100 in FIG. 1, in alternative embodiments, storage facility 104 may be external of system 100.

Management facility 102 may perform any of the tracking device monitoring operations described herein. For example, management facility 102 may identify a time period during which a vehicle equipped with a tracking device travels at least a threshold distance. The identifying may be accomplished in any suitable manner, such as by analyzing location data, motion data, and/or timestamp data acquired and/or generated by system 100 and/or the tracking device. The time period may be any suitable length of time (e.g., a few minutes, a few hours, etc.). The threshold distance may be set (e.g., automatically and/or by a user of system 100) to be any suitable distance (e.g., a few hundred feet, a mile, ten miles, etc.).

To illustrate, the threshold distance may be set to be one mile. Based on motion data acquired by the tracking device (e.g., mileage data provided to the tracking device by the vehicle by way of an OBD port included in the vehicle), management facility 102 may determine that the vehicle travels five miles during a particular trip and accordingly determine that the vehicle travels at least the threshold distance. Management facility 102 may identify the time period during which the vehicle travels at least the threshold distance by identifying, based on timestamp data acquired by the tracking device, a first timestamp corresponding to when the vehicle begins the trip (e.g., begins moving) and a second timestamp corresponding to when the vehicle ends the trip (e.g., stops moving for a predetermined amount of time). Management facility 102 may designate a difference between the second and first timestamps as the time period during which the vehicle travels at least the threshold distance.

In order to detect possible instances of interference with the tracking device during the identified time period, management facility 102 may determine that the tracking device fails to acquire a desired signal for a predetermined amount of time during the identified time period. As used herein, a "desired signal" may include any legitimate (i.e., not counterfeit, as will be described below) signal that may be received by the tracking device. For example, the desired signal may include a GPS signal received from a GPS satellite. Additionally or alternatively, the desired signal may include a wireless network signal (e.g., a signal provided by another device or system by way of a wireless network, such as a mobile telephone or data network, a Wi-Fi network, etc.).

The predetermined amount of time during the time period may be set to be any amount of time during the identified time period. For example, to account for the occasional loss of signal that may occur during a trip (e.g., when the vehicle passes through a tunnel), the predetermined amount of time may be set to be two minutes, for example. In some examples, the predetermined amount of time may be set to be a certain percentage of the identified time period.

Various ways in which management facility 102 may determine that the tracking device fails to acquire a desired signal for the predetermined amount of time will be described below.

Based on the determination that the tracking device fails to acquire the desired signal for the predetermined amount of time during the time period during which the vehicle travels at least the threshold distance, management facility 102 may determine that the tracking device is potentially being interfered with during the time period. For example, as will be described below, management facility 102 may determine that the tracking device is potentially being interfered with by a GPS signal jamming device, a wireless network signal jamming device, a signal blocking shield, and/or a device that transmits counterfeit GPS signals (i.e., a "GPS signal spoofer"). Exemplary manners in which this determination may be made will be described below.

Figure 2:
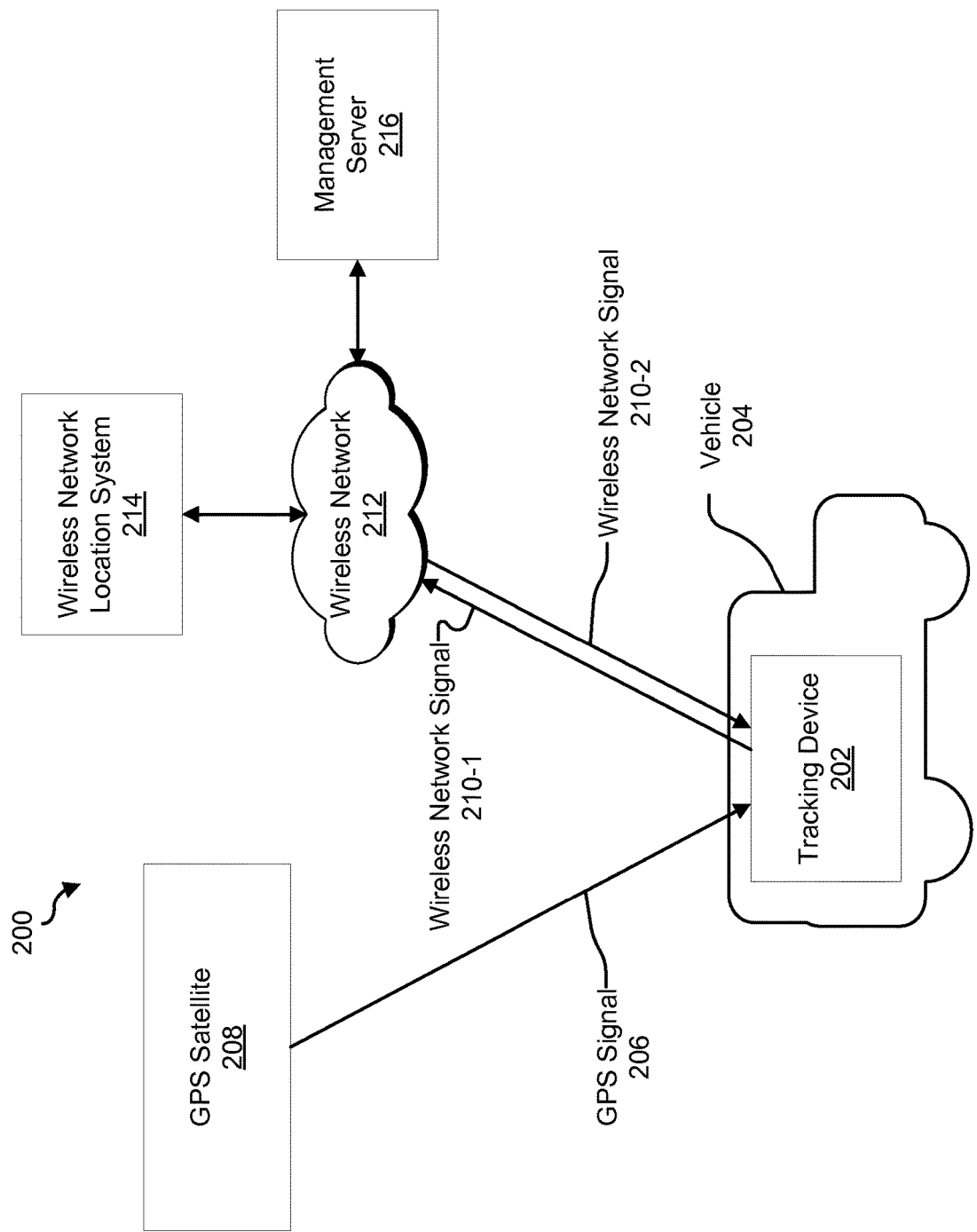
FIG. 2 illustrates an exemplary configuration in which a tracking device associated with a vehicle may be monitored according to principles described herein.

FIG. 2 illustrates an exemplary configuration 200 in which a tracking device 202 associated with a vehicle 204 may be monitored in accordance with the methods and systems described herein. The components shown in FIG. 2 are illustrative only. It will be recognized that additional or alternative components may be included in configuration 200 as may serve a particular implementation.

Vehicle 204 may include any suitable motorized or non-motorized vehicle (e.g., a car, a truck, a boat, a train, an airplane, a bicycle, etc.). In some instances, vehicle 204 may be included in a fleet of vehicles managed by a particular entity (e.g., a fleet of service vehicles managed by a particular company).

Tracking device 202 may include any suitable device that tracks a location of vehicle 204. In some examples, tracking device 202 may be implemented by a device configured to communicate with a computing system of vehicle 204 (e.g., by being plugged in to the OBD port of vehicle 204). Alternatively, tracking device 202 may be implemented by a stand-alone device (e.g., a GPS device, a mobile computing device such as a smartphone or tablet computer) that does not communicate directly with a computing system of vehicle 204. In some examples, tracking device 202 may be integrated into vehicle 204 (e.g., included in a computing system of vehicle 204). Additionally or alternatively, tracking device 202 may be configured to communicate with a mobile computing device (e.g., a smartphone or tablet computer) located within a predetermined vicinity of tracking device 202. In this configuration, tracking device 202 may leverage one or more capabilities of the mobile computing device (e.g., communication capabilities, GPS tracking capabilities, etc.).

Tracking device 202 may track the geographic location of vehicle 204 in any suitable manner. For example, as shown, tracking device 202 may track the geographic location of vehicle 204 by acquiring a GPS signal 206 from a GPS satellite 208. GPS signal 206 may be representative of one or more GPS signals received from GPS satellite 208. Tracking device 202 may generate location data based on the GPS signal 206 and, in some instances, timestamp data corresponding to the location data. Tracking device 202 may store the location data and timestamp data for later retrieval or transmission to an external system for analysis.

As shown, tracking device 202 may also be configured to transmit a wireless network signal 210-1 (which may be representative of one or more wireless network signals transmitted by tracking device 202) and receive a wireless network signal 210-2 (which may be representative of one or more wireless network signals received by tracking device 202) by way of a wireless network 212. Wireless network signals 210-1 and 210-2 may be collectively referred to as "wireless network signals 210". Wireless network 212 may include a 4G LTE network, a 3G network, a 2G network, a Wi-Fi network, and/or any other type of wireless network as may serve a particular implementation. In some examples, wireless network 212 is provided and/or managed by a mobile carrier.

In this configuration, tracking device 202 may additionally or alternatively track the geographic location of vehicle 204 by transmitting a wireless network signal 210-1 that is detected by a wireless network location system 214. Wireless network location system 214 may be implemented by one or more cell phone towers and computing devices, for example, and may apply a triangulation heuristic to the wireless network signal 210-1 in order to determine a geographic location of the vehicle 204. Wireless network location system 214 may generate location data representative of the determined geographic location and provide the location data to system 100 in any suitable manner.

While FIG. 2 shows tracking device 202 capable of receiving GPS signal 206 and transmitting and receiving wireless network signals 210, it will be recognized that, in some examples, tracking device 202 may be configured to only receive and/or transmit one type of signal. For example, tracking device 202 may be configured to receive GPS signals, but not transmit/receive wireless network signals.

In some examples, tracking device 202 may acquire and/or generate motion data associated with vehicle 204. For example, tracking device 202 may acquire motion data associated with vehicle 204 from an OBD system included in vehicle 204. Tracking device 202 may generate additional motion data based on this acquired motion data (e.g., mileage data that indicates a number of miles that vehicle 204 travels during a particular trip). Additionally or alternatively, tracking device 202 itself (or a mobile computing device communicatively coupled to tracking device 202) may detect movement, velocity, acceleration, elevation change, direction, and/or any other indicator associated with movement of vehicle 204.

Tracking device 202 may provide data (e.g., location data, motion data, and/or timestamp data) that it acquires and/or generates to system 100 in any suitable manner. For example, tracking device 202 may wirelessly transmit the data to a management server 216 by way of wireless network 212. Management server 216 may include one or more computing devices managed by any suitable entity (e.g., an owner of vehicle 204 or a provider of a monitoring service for vehicle 204). The data may be wirelessly transmitted to management server 216 in real-time as it is acquired and/or generated. Alternatively, the data may be periodically transmitted to management server 216 (e.g., at the end of every day or trip). In some examples, the data may be transmitted to management server 216 by physically connecting tracking device 202 to management server 216.

Tracking device 202, management server 216, and wireless network location system 214 may communicate using any communication platforms and technologies suitable for transporting data (e.g., location data, motion data, and/or timestamp data) and/or communication signals, including known communication technologies, devices, media, and protocols supportive of remote communications, examples of which include, but are not limited to, data transmission media, communications devices, Transmission Control Protocol ("TCP"), Internet Protocol ("IP"), HTTP, Hypertext Transfer Protocol Secure ("HTTPS"), Session Initiation Protocol ("SIP"), Simple Object Access Protocol ("SOAP"), Extensible Mark-up Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, wireless communication technologies, Internet communication technologies, media streaming technologies, media download technologies, and other suitable communications technologies.

System 100 may be implemented by one or more of the components shown in FIG. 2. For example, system 100 may be implemented entirely by management server 216. In other embodiments, components of system 100 may be distributed across any combination or sub-combination of management server 216, wireless network location system 214, and tracking device 202.

In some examples, tracking device 202 may be interfered with while vehicle 204 is moving. For example, a driver of vehicle 204 may intentionally prevent tracking device 202 from acquiring GPS signal 206 and/or wireless network signal 210-2 while the driver takes vehicle 204 on an unauthorized trip. Various manners in which tracking device 202 may be interfered with will now be described in connection with FIGS. 3-6.

Figure 3:
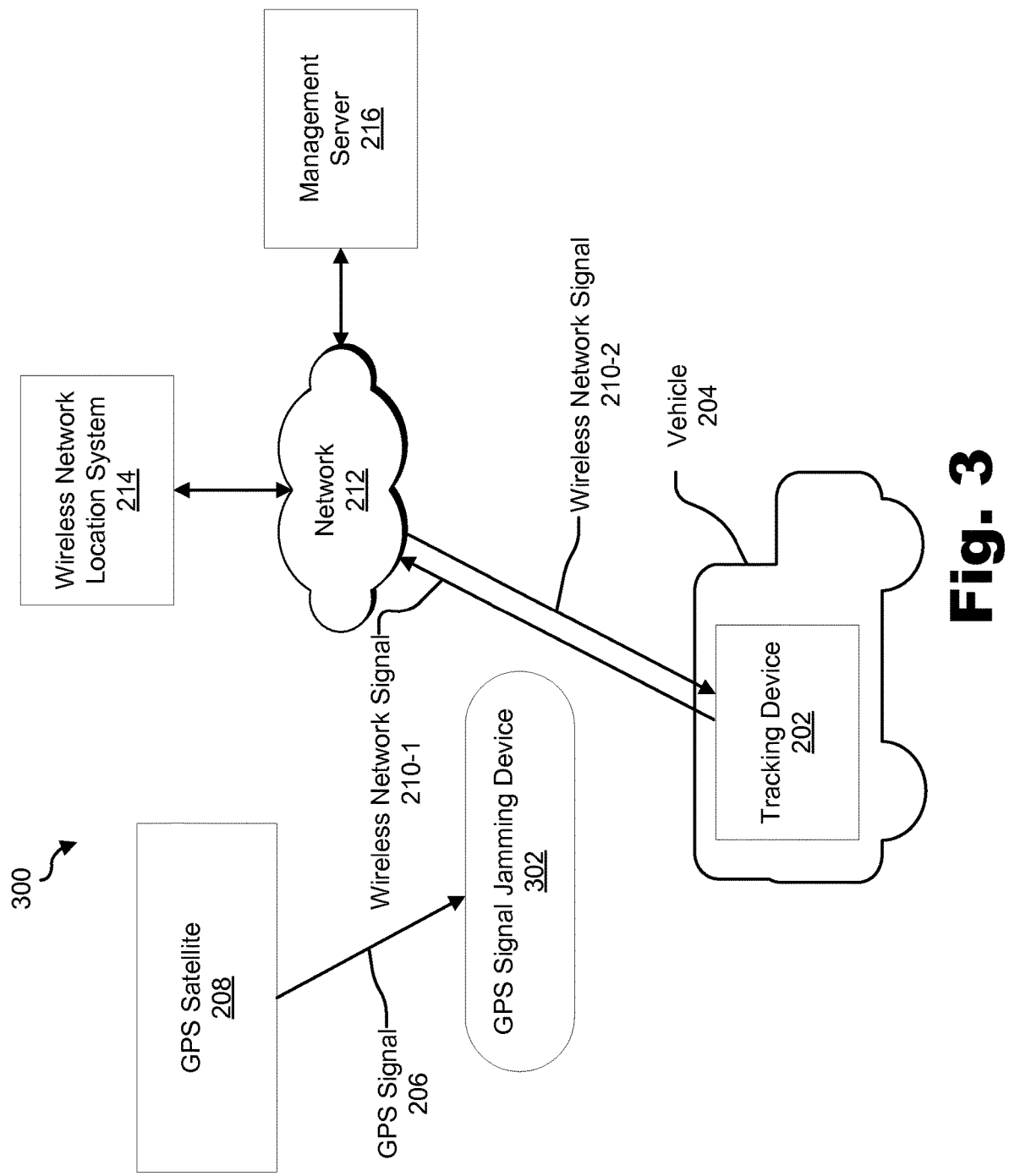
FIGS. 3-6 illustrate various manners in which a tracking device may be interfered with according to principles described herein.

FIG. 3 illustrates an exemplary scenario 300 in which a GPS signal jamming device 302 is used to interfere with tracking device 202. As shown, GPS signal jamming device 302 prevents tracking device 202 from acquiring GPS signal 206. GPS signal jamming device 302 may do this in any suitable manner. For example, GPS signal jamming device 302 may transmit one or more signals that block, jam, or otherwise interfere with GPS signal 206. While GPS signal jamming device 302 is depicted as being external to vehicle 204, GPS signal jamming device 302 may be physically located inside vehicle 204.

System 100 may determine that GPS signal jamming device 302 interferes with tracking device 202 in any suitable manner. For example, tracking device 202 may transmit location data, motion data, and/or timestamp data to management server 216 for storage and/or analysis. Based on the transmitted data, management server 216 may identify a time period during which vehicle 204 travels at least a threshold distance and then determine that tracking device 202 failed to acquire GPS signal 206 for a predetermined amount of time during the time period. The identification of the time period and the determination that the tracking device 202 failed to acquire GPS signal 206 for the predetermined amount of time may be performed in any of the ways described herein.

Based on the determination that tracking device 202 failed to acquire GPS signal 206 for the predetermined amount of time, management server 216 may determine that tracking device 202 was potentially interfered with by a GPS signal jamming device (e.g., GPS signal jamming device 302).

This determination may be further based on one or more other factors. For example, based on the data received by management server 216 from tracking device 202, management server 216 may determine that tracking device 202 was able to acquire wireless network signal 210-2 during the time period. This may be evidence that a GPS signal jamming device 302 (as opposed to another type of interference device that would also prevent tracking device 202 from acquiring wireless network signal 210-2) was used to interfere with tracking device 202. Hence, the determination that tracking device 202 was potentially interfered with by a GPS signal jamming device may be further based on a determination that tracking device 202 was able to acquire wireless network signal 210-2 during the time period.

Figure 4:
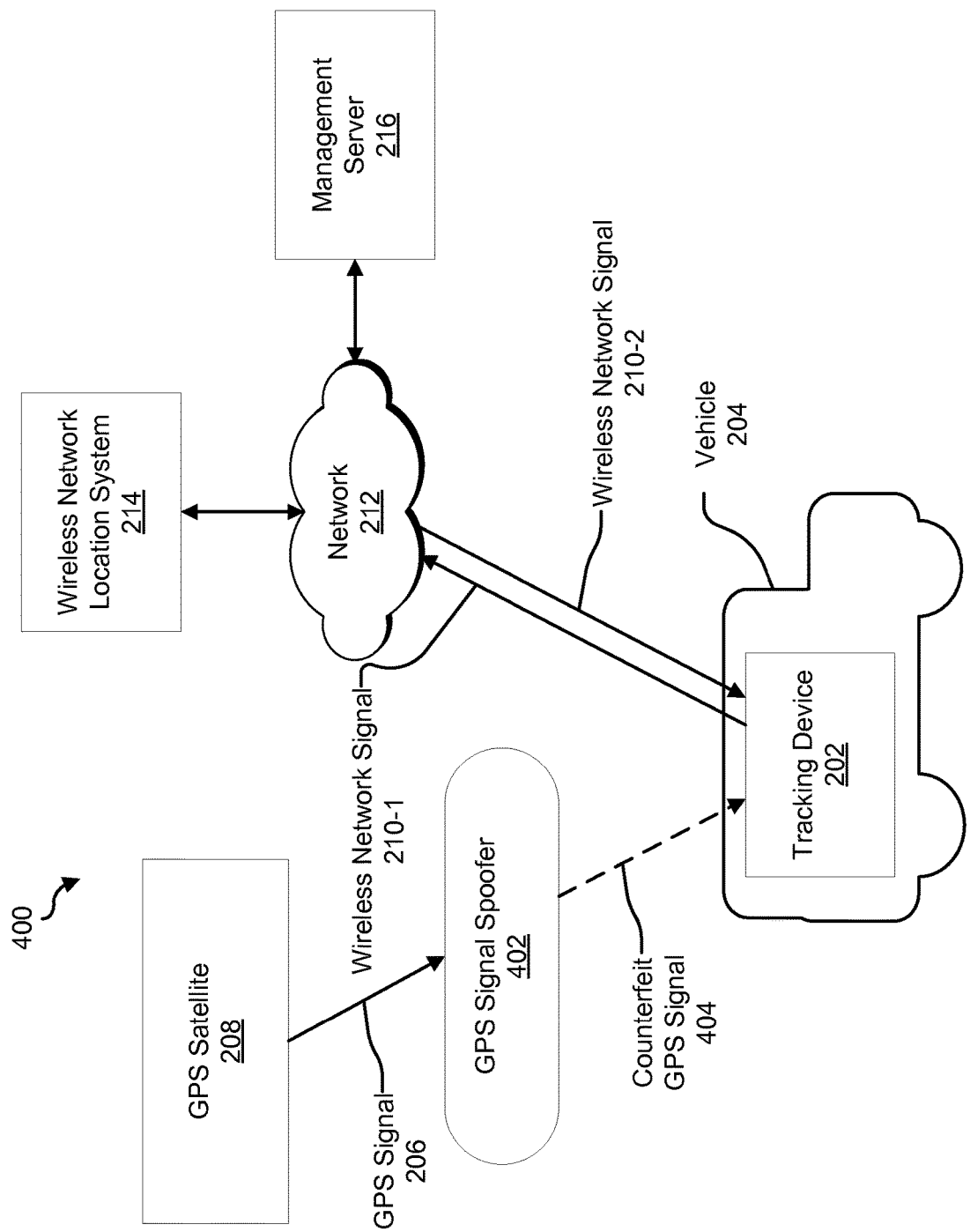

FIG. 4 illustrates an exemplary scenario 400 in which a GPS signal spoofer 402 is used to interfere with tracking device 202. As shown, GPS signal spoofer 402 prevents tracking device 202 from acquiring GPS signal 206 by causing tracking device 202 to instead acquire a counterfeit GPS signal 404. GPS signal spoofer 402 may do this in any suitable manner. For example, GPS signal spoofer 402 may transmit counterfeit GPS signal 404 such that counterfeit GPS signal 404 overpowers and/or obscures GPS signal 206. While GPS signal spoofer 402 is depicted as being external to vehicle 204, GPS signal spoofer 402 may be physically located inside vehicle 204.

System 100 may determine that GPS signal spoofer 402 interferes with tracking device 202 in any suitable manner. For example, as described above, tracking device 202 may transmit location data, motion data, and/or timestamp data to management server 216 for storage and/or analysis. Based on the transmitted data, management server 216 may identify a time period during which vehicle 204 travels at least a threshold distance. The identification of the time period may be performed in any of the ways described herein.

Management server 216 may then determine that tracking device 202 failed to acquire GPS signal 206 for a predetermined amount of time during the time period. The determination that the tracking device 202 failed to acquire GPS signal 206 for the predetermined amount of time during the time period may include determining that tracking device 202 acquired a counterfeit GPS signal 404 instead of GPS signal 206 for the predetermined amount of time during the time period. This determination may be made in any suitable manner.

For example, management server 216 may identify, based on a GPS signal acquired by tracking device 202 during the predetermined amount of time, a first geographic location corresponding to a particular point in time. Management server 216 may also identify, based on a wireless network signal 210-1 transmitted by tracking device 202 during the predetermined amount of time, a second geographic location corresponding to the particular point in time. Management server 216 may compare the first and second geographic locations and, based on the comparison, determine that the second geographic location is located outside a predetermined distance from the first geographic location. This determination may indicate that the GPS signal received by tracking device 202 is counterfeit GPS signal 404 instead of GPS signal 206 and that tracking device 202 was potentially interfered with by a GPS signal spoofer (e.g., GPS signal spoofer 402).

As an example, vehicle 204 may travel at least the predetermined threshold distance during a time period that begins at 12:00 pm and ends at 1:00 pm on a particular day. During this trip, tracking device 202 may acquire a GPS signal that indicates that the vehicle 204 was supposedly at a first geographic location included in a first city at 12:30 pm. During the trip, tracking device 202 may also transmit a wireless network signal to wireless network location system 214. Wireless network location system 214 may apply a triangulation heuristic to the wireless network signal and determine that the vehicle was at a second geographic location included in a second city at the same time (i.e., 12:30 pm). Management server 216 may determine that the second geographic location is located outside a predetermined distance (e.g., one mile) from the first geographic location. Based on this determination, management server 216 may determine that the GPS signal acquired by tracking device 202 is a counterfeit GPS signal provided by a GPS signal spoofer.

Figure 5:
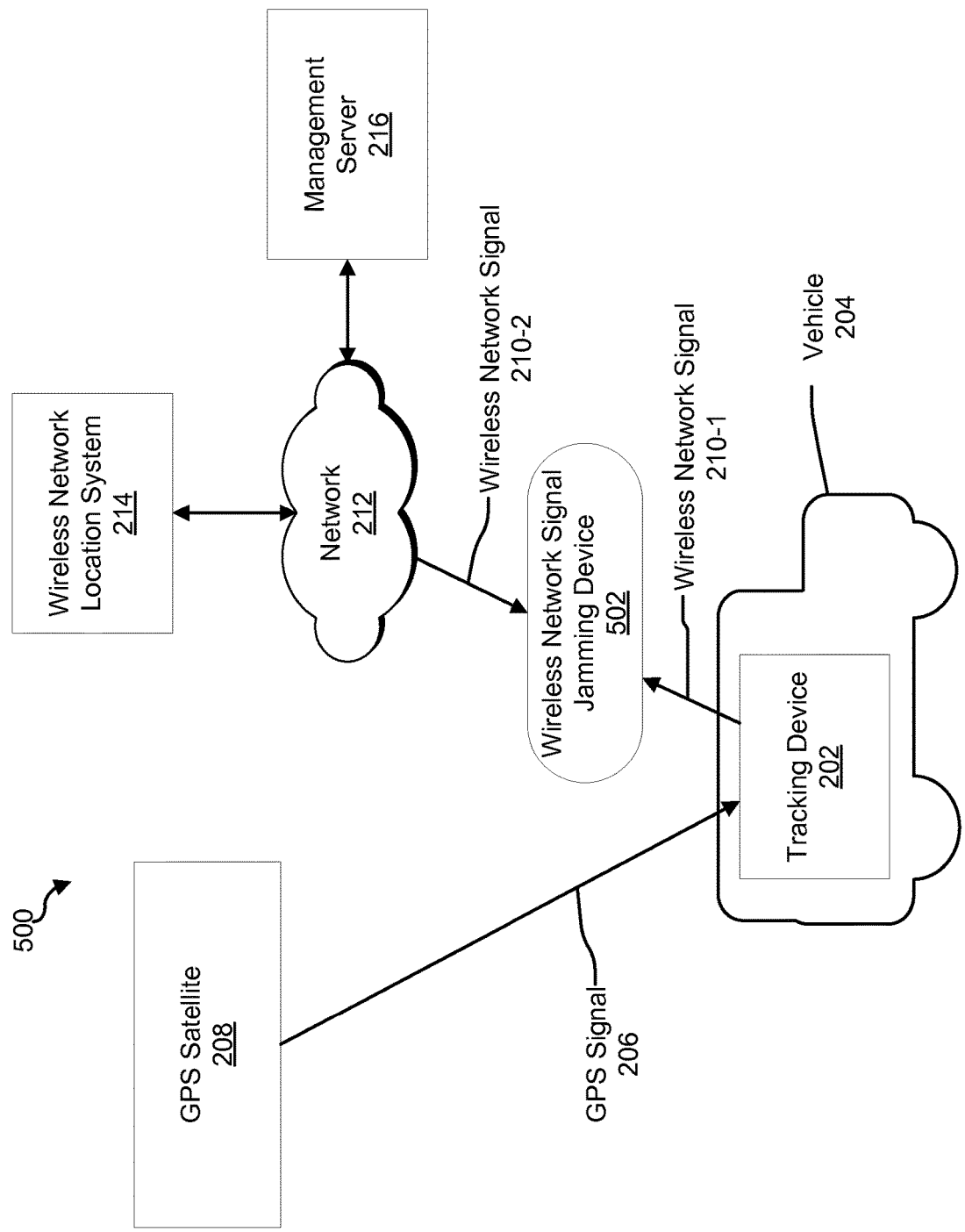

FIG. 5 illustrates an exemplary scenario 500 in which a wireless network signal jamming device 502 is used to interfere with tracking device 202. As shown, wireless network signal jamming device 502 prevents tracking device 202 from acquiring wireless network signal 210-2. Wireless network signal jamming device 502 may do this in any suitable manner. For example, wireless network signal jamming device 502 may transmit one or more signals that block, jam, or otherwise interfere with wireless network signal 210-2. While wireless network signal jamming device 502 is depicted as being external to vehicle 204, wireless network signal jamming device 502 may be physically located inside vehicle 204.

System 100 may determine that wireless network signal jamming device 502 interferes with tracking device 202 in any suitable manner. For example, as described above, tracking device 202 may transmit location data, motion data, and/or timestamp data to management server 216 for storage and/or analysis. Based on the transmitted data, management server 216 may identify a time period during which vehicle 204 travels at least a threshold distance and then determine that tracking device 202 failed to acquire wireless network signal 210-2 for a predetermined amount of time during the time period. The identification of the time period and the determination that the tracking device 202 failed to acquire wireless network signal 210-2 for the predetermined amount of time may be performed in any of the ways described herein.

Based on the determination that tracking device 202 failed to acquire wireless network signal 210-2 for the predetermined amount of time, management server 216 may determine that tracking device 202 was potentially interfered with by a wireless network signal jammer (e.g., wireless network signal jamming device 502).

This determination may be further based on one or more other factors. For example, based on the data received by management server 216 from tracking device 202, management server 216 may determine that tracking device 202 was able to acquire GPS signal 206 during the time period. This may be evidence that a wireless network signal jamming device 502 (as opposed to another type of interference device that would also prevent tracking device 202 from acquiring GPS signal 206) was used to interfere with tracking device 202. Hence, the determination that tracking device 202 was potentially interfered with by a wireless network signal jammer may be further based on a determination that tracking device 202 was able to acquire GPS signal 206 during the time period.

Figure 6:
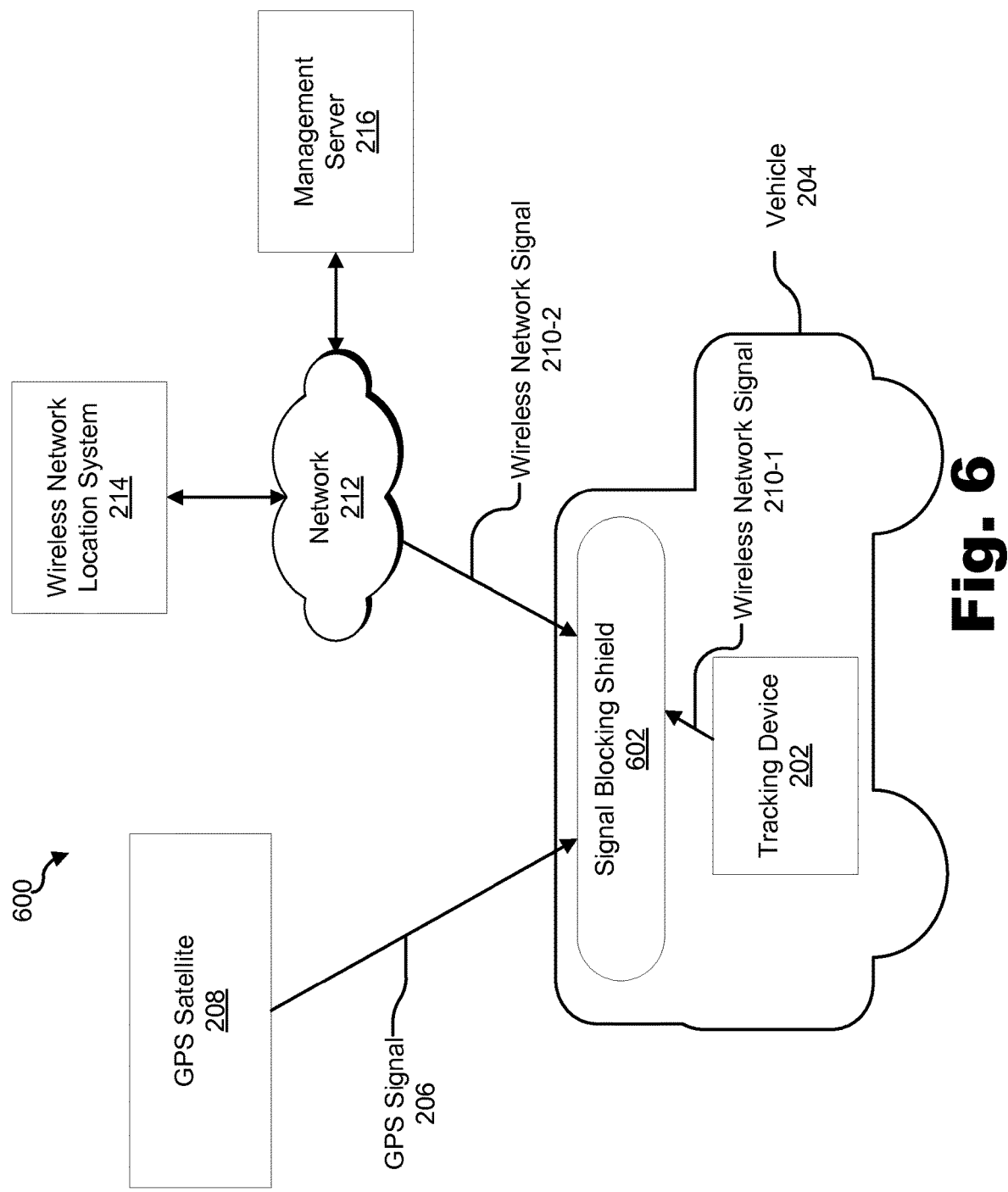

FIG. 6 illustrates an exemplary scenario 600 in which a signal blocking shield 602 is used to interfere with tracking device 202. Signal blocking shield 602 may be made out of metal, for example, and may be configured to be wrapped around, placed on top of, or otherwise obstruct tracking device 202. While signal blocking shield 602 is depicted as being internal to vehicle 204, signal blocking shield 602 may be additionally or alternatively located external to vehicle 204.

As shown, signal blocking shield 602 may prevent tracking device 202 from acquiring both GPS signal 206 and wireless network signal 210-2. Signal blocking shield 602 may do this in any suitable manner. For example, signal blocking shield 602 may block, obscure, or otherwise interfere with GPS signal 206 and wireless network signal 210-2.

System 100 may determine that signal blocking shield 602 interferes with tracking device 202 in any suitable manner. For example, as described above, tracking device 202 may transmit location data, motion data, and/or timestamp data to management server 216 for storage and/or analysis. Based on the transmitted data, management server 216 may identify a time period during which vehicle 204 travels at least a threshold distance and then determine that tracking device 202 failed to acquire GPS signal 206 and wireless network signal 210-2 for a predetermined amount of time during the time period. The identification of the time period and the determination that the tracking device 202 failed to acquire GPS signal 206 and wireless network signal 210-2 for the predetermined amount of time may be performed in any of the ways described herein.

Based on the determination that tracking device 202 failed to acquire GPS signal 206 and wireless network signal 210-2 for the predetermined amount of time, management server 216 may determine that tracking device 202 was potentially interfered with by a signal blocking shield (e.g., signal blocking shield 602).

In some embodiments, management facility 102 may provide, in response to determining that the tracking device is potentially being interfered with during the time period, a notification that a tracking interruption occurred with respect to the vehicle during the time period. The notification may include, but is not limited to, a visual and/or audible message, an electronic communication, and/or a physical or electronic record. In some examples, the notification may include information indicating what type of interference was likely used (e.g., a GPS signal jammer, a GPS signal spoofer, a wireless network signal jammer, or a signal blocking shield). The notification may additionally or alternatively include information that identifies a possible location of the interference, a time period during which the interference possibly occurred, and/or any other relevant information as may serve a particular implementation. The notification may be provided by management facility 102 in any suitable way.

For example, returning to the scenario illustrated in FIG. 6, after system 100 determines that tracking device 202 was potentially interfered with during the time period by a signal blocking shield, management facility 102 may provide an email message to a fleet manager that manages vehicle 204. The email message may include identifying information for tracking device 202 and/or vehicle 204, a message that tracking device 202 was potentially interfered with during the time period by a signal blocking shield, and a map identifying a geographic area in which the interference likely occurred.

Management facility 102 may additionally or alternatively provide a notification of a potential tracking interruption by creating one or more electronic records (e.g., one or more database records) reflecting information about the potential tracking interruption. This may be performed in any suitable manner.

In some examples, management facility 102 may automatically adjust an insurance rate (e.g., an automobile insurance rate) for a user of a vehicle based on management facility 102 determining that a tracking device associated with the vehicle is potentially being interfered with while the vehicle travels. For example, in response to management facility 102 determining that the tracking device is potentially being interfered with, management facility 102 may automatically increase the insurance rate. Additionally or alternatively, if management facility 102 determines that the tracking device is not being interfered with for a predetermined amount of time, management facility 102 may automatically decrease the insurance rate.

Management facility 102 may automatically adjust the insurance rate in any suitable manner. For example, management facility 102 may determine a "blocking percentage," which may represent a ratio of the total amount of time that the tracking device is potentially being interfered with to the total amount of time that the vehicle moves during a particular a month. Management facility 102 may then multiply the blocking percentage by the monthly insurance rate to determine an amount that the monthly insurance rate is to be increased. To illustrate, if the blocking percentage is five percent (which indicates that the tracking device is potentially being interfered with for five percent of the time that the vehicle is in operation), the monthly insurance rate may be increased by five percent.

As another example, a user who agrees to install a tracking device in his or her vehicle may receive a discount off of his or her monthly insurance rate. However, the amount of this discount may be decreased when the user interferes with the tracking device. For example, let $R_N$ represent the user's undiscounted monthly insurance rate, D represent the monthly discount that the user receives for having the tracking device, and BP represent the blocking percentage (i.e., the ratio of the total amount of time that the tracking device is potentially being interfered with to the total amount of time that the vehicle moves during a particular a month). In this case, management facility 102 may determine the user's discounted monthly insurance rate, $R_D$, in accordance with the following equation: $R_D = R_N - (D - D*BP)$.

In some examples, management facility 102 may notify the user that the insurance rate is being increased or that the insurance rate is going to be increased unless the user stops interfering with the tracking device. For example, management facility 102 may provide an alert to the user (e.g., by way of a text message, an email, a mobile application associated with the tracking device, etc.) that the tracking device being potentially interfered with and that, as a result, the user's insurance rate is going to be increased by a certain amount. In some examples, if the user stops interfering with the tracking device in response to the alert, management facility 102 may not increase the insurance rate.

Figure 7:
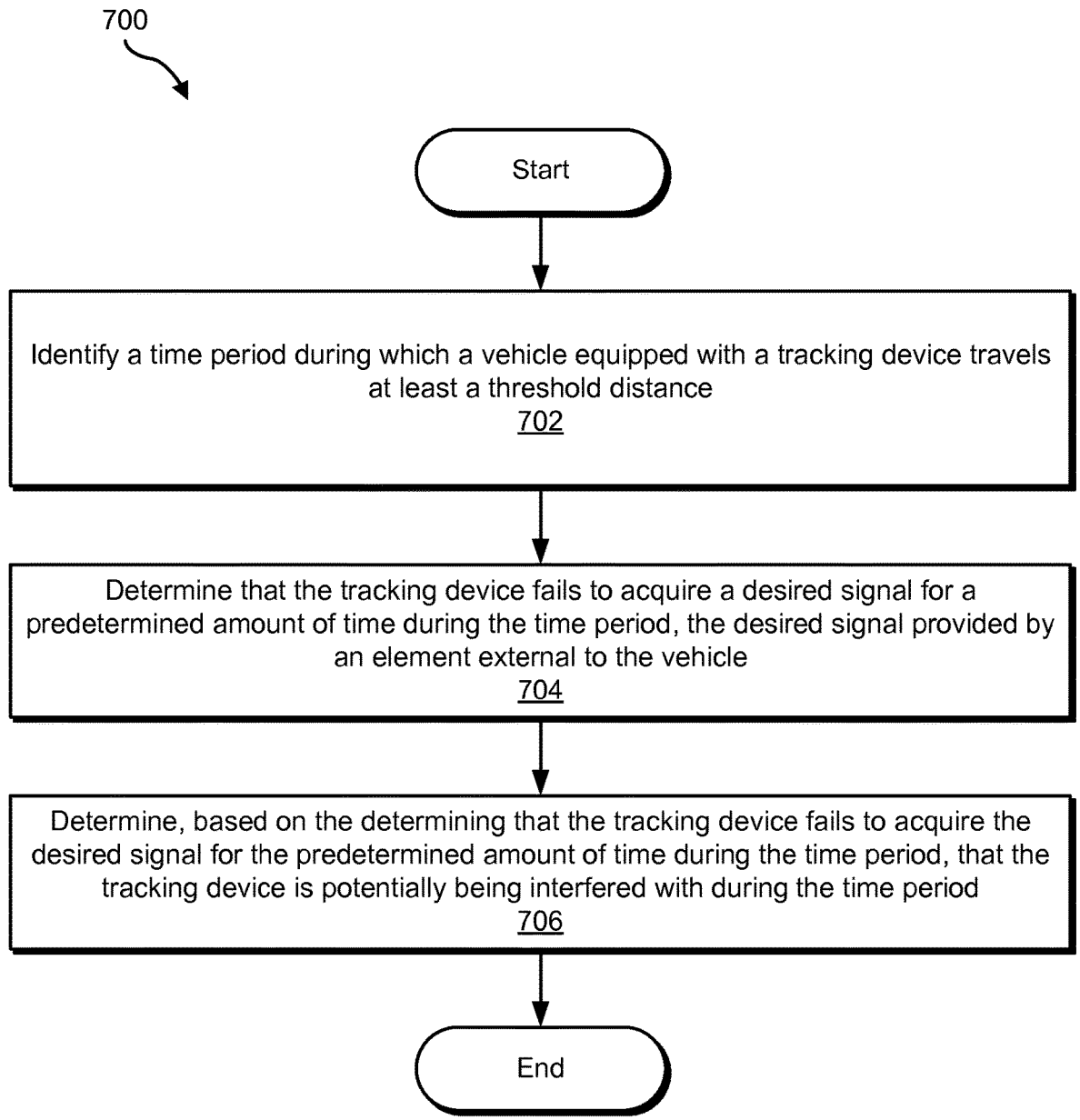
FIGS. 7-8 illustrate exemplary tracking device monitoring methods according to principles described herein.
Figure 8:
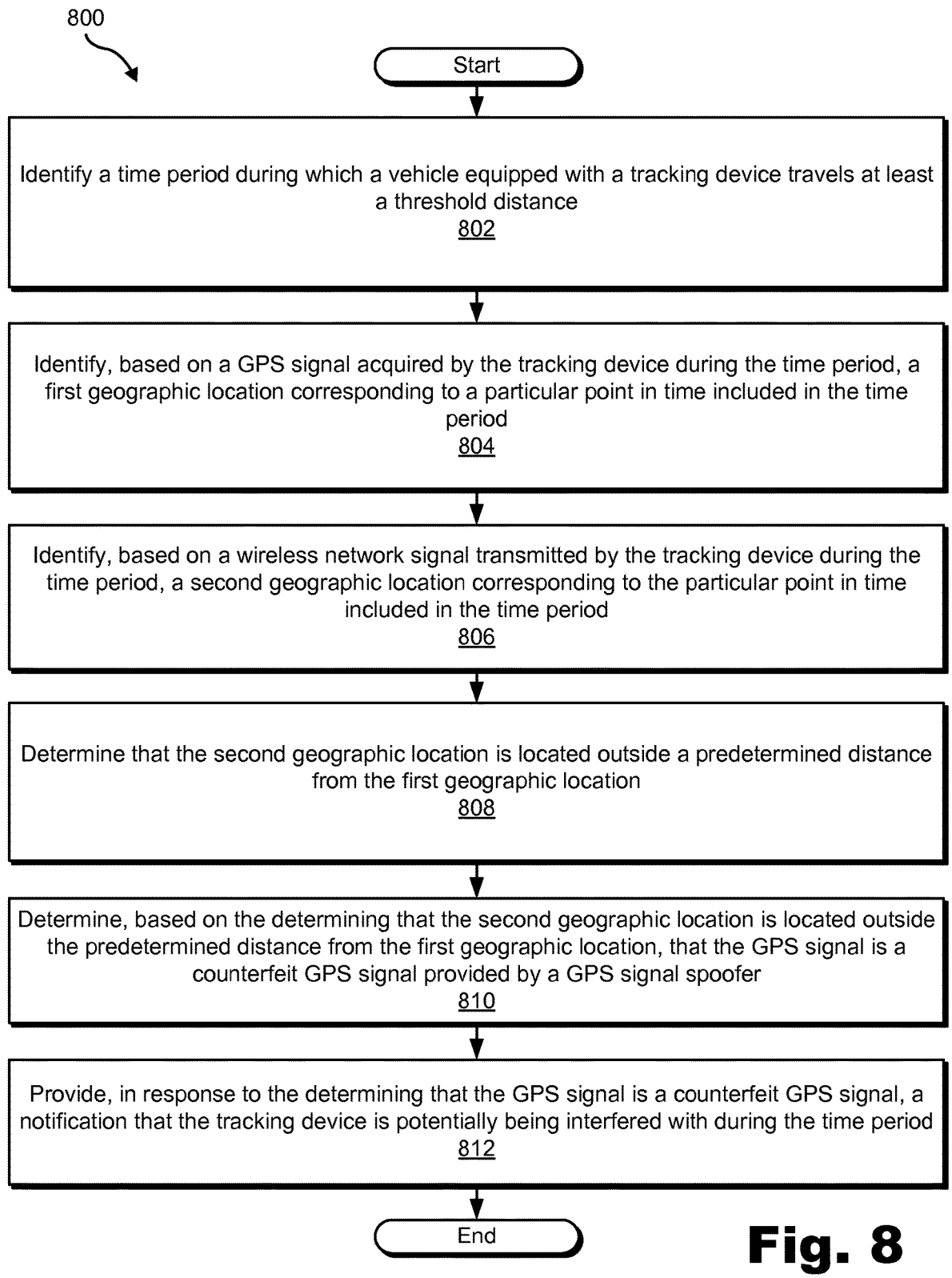

FIGS. 7-8 illustrate exemplary tracking device monitoring methods 700 and 800 according to principles described herein. While FIGS. 7-8 illustrate exemplary steps according to certain embodiments, other embodiments may omit, add to, reorder, combine, and/or modify any of the steps shown in FIGS. 7-8. In certain embodiments, one or more of the steps shown in FIGS. 7-8 may be performed by system 100 and/or one or more components or implementations of system 100.

In step 702 of FIG. 7, a monitoring system identifies a time period during which a vehicle equipped with a tracking device travels at least a threshold distance. Step 702 may be performed in any of the ways described herein.

In step 704, the monitoring system determines that the tracking device fails to acquire a desired signal for a predetermined amount of time during the time period. As described herein, the desired signal may be provided by an element external to the vehicle. Step 704 may be performed in any of the ways described herein.

In step 706, the monitoring system determines, based on the determination in step 704 that the tracking device fails to acquire the desired signal for the predetermined amount of time during the time period, that the tracking device is potentially being interfered with during the time period. Step 706 may be performed in any of the ways described herein.

In step 802 of FIG. 8, a monitoring system identifies a time period during which a vehicle equipped with a tracking device travels at least a threshold distance. Step 802 may be performed in any of the ways described herein.

In step 804, the monitoring system identifies, based on a GPS signal acquired by the tracking device during the time period, a first geographic location corresponding to a particular point in time included in the time period. Step 804 may be performed in any of the ways described herein.

In step 806, the monitoring system identifies, based on a wireless network signal transmitted by the tracking device during the time period, a second geographic location corresponding to the particular point in time included in the time period. Step 806 may be performed in any of the ways described herein.

In step 808, the monitoring system determines that the second geographic location is located outside a predetermined distance from the first geographic location. Step 808 may be performed in any of the ways described herein.

In step 810, the monitoring system determines, based on the determination in step 808 that the second geographic location is located outside the predetermined distance from the first geographic location, that the GPS signal is a counterfeit GPS signal provided by a GPS signal spoofer. Step 810 may be performed in any of the ways described herein.

In step 812, the monitoring system provides, in response to the determining that the GPS signal is a counterfeit GPS signal, a notification that the tracking device is potentially being interfered with during the time period. Step 812 may be performed in any of the ways described herein.

In certain embodiments, one or more of the components and/or processes described herein may be implemented and/or performed by one or more appropriately configured computing devices. To this end, one or more of the systems and/or components described above may include or be implemented as one or more computing systems and/or components by any computer hardware, computer-implemented instructions (e.g., software) embodied in a non-transitory computer-readable medium, or combinations of computer-implemented instructions and hardware, configured to execute one or more of the processes described herein. In particular, system components may be implemented on one physical computing device or may be implemented on more than one physical computing device. Accordingly, system components may include any number of physical computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory (DRAM), which typically constitutes a main memory. Common forms of computer-readable media include, for example, a floppy disk, flexible disk, hard disk, magnetic tape, any other magnetic medium, a Compact Disc Read-Only Memory (CD-ROM), DVD, any other optical medium, a Random-Access Memory (RAM), a Programmable ROM (PROM), an Erasable PROM (EPROM), an Electrically Erasable PROM (EEPROM), a Flash Electrically Erasable PROM (FLASH-EEPROM), any other memory chip or cartridge, or any other tangible medium from which a computer may read.

Figure 9:
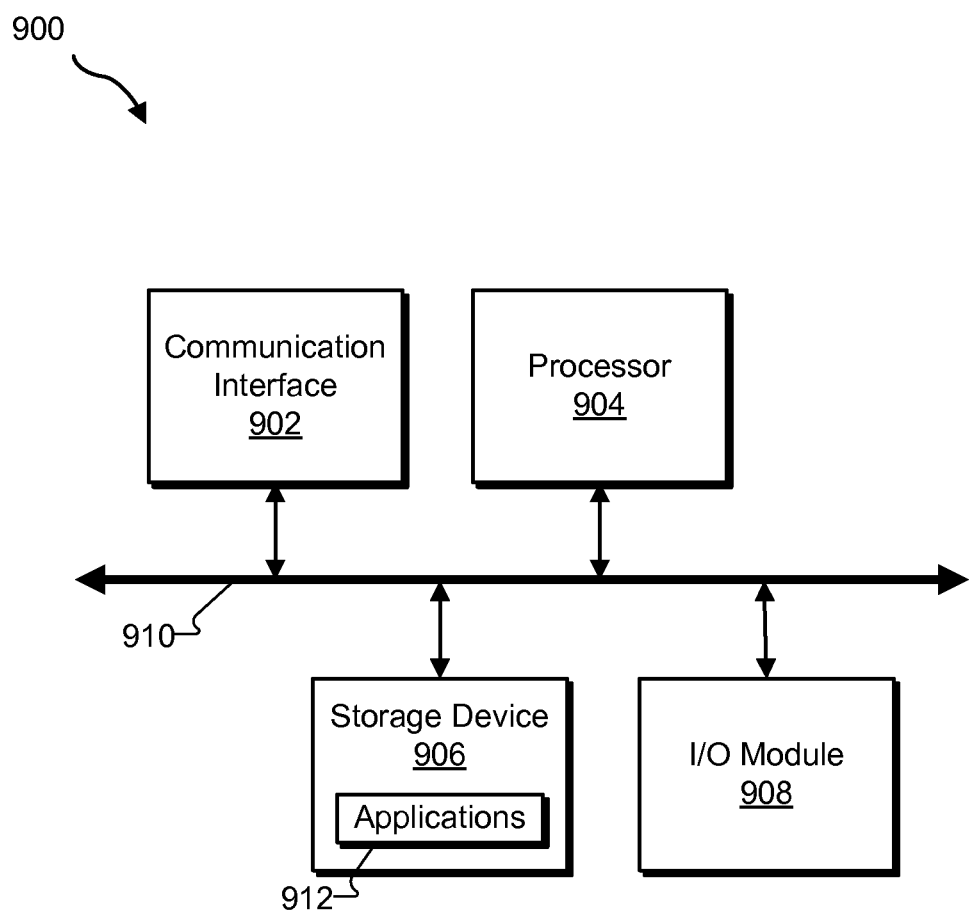
FIG. 9 illustrates an exemplary computing device according to principles described herein.

FIG. 9 illustrates an exemplary computing device 900 that may be configured to perform one or more of the processes described herein. As shown in FIG. 9, computing device 900 may include a communication interface 902, a processor 904, a storage device 906, and an input/output (I/O) module 908 communicatively connected via a communication infrastructure 910. While an exemplary computing device 900 is shown in FIG. 9, the components illustrated in FIG. 9 are not intended to be limiting. Additional or alternative components may be used in other embodiments. For example, in addition or alternative to being communicatively connected by way of communication infrastructure 910, one or more components of computing device 900 may be communicatively connected by way of one or more other suitable interfaces. For instance, communication interface 902, storage device 906, I/O module 908, and/or any other components of computing device 900 may be communicatively coupled directly to processor 904 via one or more interfaces (e.g., discrete interfaces). Components of computing device 900 shown in FIG. 9 will now be described in additional detail.

Communication interface 902 may be configured to communicate with one or more computing devices. Examples of communication interface 902 include, without limitation, a wired network interface (such as a network interface card), a wireless network interface (such as a wireless network interface card), a modem, and any other suitable interface. In at least one embodiment, communication interface 902 may provide a direct connection between system 100 and one or more of provisioning systems via a direct link to a network, such as the Internet. Communication interface 902 may additionally or alternatively provide such a connection through, for example, a local area network (such as an Ethernet network), a personal area network, a telephone or cable network, a satellite data connection, a dedicated URL, or any other suitable connection. Communication interface 902 may be configured to interface with any suitable communication media, protocols, and formats, including any of those mentioned above.

Processor 904 generally represents any type or form of processing unit capable of processing data or interpreting, executing, and/or directing execution of one or more of the instructions, processes, and/or operations described herein.

Processor 904 may direct execution of operations in accordance with one or more applications 912 or other computer-executable instructions such as may be stored in storage device 906 or another computer-readable medium.

Storage device 906 may include one or more data storage media, devices, or configurations and may employ any type, form, and combination of data storage media and/or device. For example, storage device 906 may include, but is not limited to, a hard drive, network drive, flash drive, magnetic disc, optical disc, RAM, DRAM, other non-volatile and/or volatile data storage units, or a combination or sub-combination thereof. Electronic data, including data described herein, may be temporarily and/or permanently stored in storage device 906. For example, data representative of one or more executable applications 912 (which may include, but are not limited to, one or more of the software applications described herein) configured to direct processor 904 to perform any of the operations described herein may be stored within storage device 906. In some examples, data may be arranged in one or more databases residing within storage device 906.

I/O module 908 may be configured to receive user input and provide user output and may include any hardware, firmware, software, or combination thereof supportive of input and output capabilities. For example, I/O module 908 may include hardware and/or software for capturing user input, including, but not limited to, a keyboard or keypad, a touch screen component (e.g., touch screen display), a receiver (e.g., an RF or infrared receiver), and/or one or more input buttons.

I/O module 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 908 is configured to provide graphical data to a display for presentation to a user. The graphical data may be representative of one or more graphical user interfaces and/or any other graphical content as may serve a particular implementation.

In some examples, any of the systems and/or facilities described herein may be implemented by or within one or more components of computing device 900. For example, one or more applications 912 residing within storage device 906 may be configured to direct processor 904 to perform one or more processes or functions associated with system 100 or any components thereof.

To the extent the aforementioned embodiments collect, store, and/or employ personal information provided by individuals (or other entities), it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   determining, by a monitoring system based on motion data acquired by a tracking device associated with a vehicle, that the vehicle travels at least a threshold distance between when the vehicle begins moving and when the vehicle stops moving;
   identifying, by the monitoring system, a time period during which the vehicle travels at least the threshold distance, the identifying of the time period during which the vehicle travels at least the threshold distance comprising
      identifying, based on timestamp data acquired by the tracking device, a first timestamp corresponding to when the vehicle begins moving and a second timestamp corresponding to when the vehicle stops moving, and
      designating a difference between the second timestamp and the first timestamp as the time period during which the vehicle travels at least the threshold distance;
   accessing, by the monitoring system, a global positioning system (GPS) signal acquired by the tracking device during the time period;
   identifying, based on the GPS signal acquired by the tracking device during the time period, a first geographic location corresponding to a particular point of time included in the time period;
   applying, by the monitoring system, a triangulation heuristic to a wireless network signal transmitted by the tracking device during the time period;
   identifying, by the monitoring system based on the applying of the triangulation heuristic to the wireless network signal, a second geographic location corresponding to the particular point in time included in the time period;
   determining, by the monitoring system, that the second geographic location is outside a predetermined distance from the first geographic location;
   determining, by the monitoring system based on the determination that the second geographic location is outside the predetermined distance from the first geographic location, that the GPS signal includes a counterfeit GPS signal instead of a legitimate GPS signal for an amount of time during the time period, the amount of time including the particular point in time;
   determining, by the monitoring system, based on the determining that the GPS signal includes the counterfeit GPS signal, that the tracking device is potentially being interfered with during the time period; and
   providing, by the monitoring system in response to the determining that the tracking device is potentially being interfered with during the time period, a notification to an entity that manages the vehicle, the notification including information that indicates a type of interference used to interfere with the tracking device, information that identifies at least one of the tracking device and the vehicle, and a possible location of the interference.

2. The method of claim 1, wherein the determining that the tracking device is potentially being interfered with during the time period comprises determining that the tracking device is potentially being interfered with during the time period by a GPS signal spoofer.

3. The method of claim 1, further comprising:
automatically adjusting, by the monitoring system based on the determining that the tracking device is potentially being interfered with during the time period, an insurance rate for the user.

4. The method of claim 1, embodied as computer-executable instructions on at least one non-transitory computer-readable medium.

5. A system comprising:
at least one physical computing device that:
  determines, based on motion data acquired by a tracking device associated with a vehicle, that the vehicle travels at least a threshold distance between when the vehicle begins moving and when the vehicle stops moving;
  identifies a time period during which the vehicle travels at least the threshold distance by
    identifying, based on timestamp data acquired by the tracking device, a first timestamp corresponding to when the vehicle begins moving and a second timestamp corresponding to when the vehicle stops moving, and
    designating a difference between the second timestamp and the first timestamp as the time period during which the vehicle travels at least the threshold distance;
  accesses a global positioning system (GPS) signal acquired by the tracking device during the time period;
  identifies, based on the GPS signal acquired by the tracking device during the time period, a first geographic location corresponding to a particular point of time included in the time period;
  identifies, based on an application of a triangulation heuristic to a wireless network signal transmitted by the tracking device during the time period, a second geographic location corresponding to the particular point in time included in the time period;
  determines that the second geographic location is outside a predetermined distance from the first geographic location;
  determines, based on the determination that the second geographic location is outside the predetermined distance from the first geographic location, that the GPS signal includes a counterfeit GPS signal instead of a legitimate GPS signal for an amount of time during the time period, the amount of time including the particular point in time;
  determines, based on the determination that the GPS signal includes the counterfeit GPS signal, that the tracking device is potentially being interfered with during the time period; and
  provides, in response to the determination that the tracking device is potentially being interfered with during the time period, a notification to an entity that manages the vehicle, the notification including information that indicates a type of interference used to interfere with the tracking device, information that identifies at least one of the tracking device and the vehicle, and a possible location of the interference.

6. The method of claim 1, wherein the notification comprises at least one of a visual message and an audible message.

7. The method of claim 1, wherein the notification comprises an email message.

8. The method of claim 3, wherein the automatically adjusting of the insurance rate comprises decreasing an amount of a discount applied to an insurance rate for the user.

9. The method of claim 1, wherein the determining that the GPS signal includes the counterfeit GPS signal instead of the legitimate GPS signal for the amount of time further comprises determining that the tracking device fails to acquire a desired signal for a certain percentage of the identified time period.

10. The system of claim 5, wherein the determination that the tracking device is potentially being interfered with during the time period comprises determining that the tracking device is potentially being interfered with during the time period by a GPS signal spoofer.

11. The system of claim 5, wherein the at least one physical computing device further automatically adjusts, based on the determination that the tracking device is potentially being interfered with during the time period, an insurance rate for the user.

12. The system of claim 11, wherein the automatic adjustment of the insurance rate comprises decreasing an amount of a discount applied to an insurance rate for the user.

13. The system of claim 5, wherein the notification comprises at least one of a visual message and an audible message.

14. The system of claim 5, wherein the notification comprises an email message.

15. A non-transitory computer-readable medium storing instructions that, when executed, direct at least one processor of a computing device to:
  determine, based on motion data acquired by a tracking device associated with a vehicle, that the vehicle travels at least a threshold distance between when the vehicle begins moving and when the vehicle stops moving;
  identify a time period during which the vehicle travels at least the threshold distance by
    identifying, based on timestamp data acquired by the tracking device, a first timestamp corresponding to when the vehicle begins moving and a second timestamp corresponding to when the vehicle stops moving, and
    designating a difference between the second timestamp and the first timestamp as the time period during which the vehicle travels at least the threshold distance;
  access a global positioning system (GPS) signal acquired by the tracking device during the time period;
  identify, based on the GPS signal acquired by the tracking device during the time period, a first geographic location corresponding to a particular point of time included in the time period;
  identify, based on an application of a triangulation heuristic to a wireless network signal transmitted by the tracking device during the time period, a second geographic location corresponding to the particular point in time included in the time period;
  determine that the second geographic location is outside a predetermined distance from the first geographic location;
  determine, based on the determination that the second geographic location is outside the predetermined distance from the first geographic location, that the GPS signal includes a counterfeit GPS signal instead of a legitimate GPS signal for an amount of time during the time period, the amount of time including the particular point in time;

determine, based on the determination that the GPS signal includes the counterfeit GPS signal, that the tracking device is potentially being interfered with during the time period; and provide, in response to the determination that the tracking device is potentially being interfered with during the time period, a notification to an entity that manages the vehicle, the notification including information that indicates a type of interference used to interfere with the tracking device, information that identifies at least one of the tracking device and the vehicle, and a possible location of the interference.

16. The non-transitory computer-readable medium of claim 15, wherein the determination that the tracking device is potentially being interfered with during the time period comprises determining that the tracking device is potentially being interfered with during the time period by a GPS signal spoofer.

17. The non-transitory computer-readable medium of claim 15, wherein the instructions, when executed, direct the at least one processor of the computing device to automatically adjust, based on the determination that the tracking device is potentially being interfered with during the time period, an insurance rate for the user.

18. The non-transitory computer-readable medium of claim 17, wherein the automatic adjustment of the insurance rate comprises decreasing an amount of a discount applied to an insurance rate for the user.

19. The non-transitory computer-readable medium of claim 15, wherein the notification comprises at least one of a visual message and an audible message.

20. The non-transitory computer-readable medium of claim 15, wherein the notification comprises an email message.

* * * * *